United States Patent

[11] 3,585,303

[72] Inventor Alexander B. Chieffo
17912 Sunburst St., Northridge, Calif.

[21] Appl. No. 779,295
[22] Filed Oct. 21, 1968
[45] Patented June 15, 1971

[54] TELEPHONE COMMUNICATION SYSTEM FOR THE DEAF
6 Claims, 2 Drawing Figs.

[52] U.S. Cl. ........ 179/1, 179/107, 179/84, 179/2
[51] Int. Cl. ........ H04m 11/02
[50] Field of Search ........ 179/1WIS, 1.7, 84 L, 81 C, 107, 81 B, 2 DP; 73/71.2, 71.4; 340/248, 261, 371, 407

[56] References Cited

UNITED STATES PATENTS

| | | | |
|---|---|---|---|
| 2,517,368 | 8/1950 | Wiseley | 179/107 X |
| 2,608,614 | 8/1952 | Williams | 179/84 X |
| 3,017,631 | 1/1962 | Fink et al. | 340/407 |
| 2,684,996 | 7/1954 | Potts | 179/4 |

OTHER REFERENCES

BELL TELEPHONE MAGAZINE, Winter 1965-66, pages 57-8 (Scientific Library TKI B436)

" Special Equipment Is Designed For Use By Persons With Physical Handicaps" ; CHESAPEAKE & POTOMAC TELEPHONE CO. PUBLICATION; Sept. 1966; Vol. XXXVII (37), No. 9.

Gryb, R. M. "Recorded Carrier System for High-Speed Data Transmission" BELL LABORATORIES RECORD; Sept. 1957; pp. 321–325.

*Primary Examiner*—William C. Cooper
*Attorney*—Flam & Flam

ABSTRACT: The instrument described herein makes it possible for deaf persons to make telephone calls to, and to receive telephone calls from, other deaf persons and to enable speaking and nonspeaking deaf persons to make telephone calls to, and to receive telephone calls from hearing persons. The usual call signal or ring is transformed into a signal cognizable by the deaf, such as blinking light flashes. Voiced sounds are transformed into lights whereby the deaf person can receive information from speech. A telegraph key produces light signals for communication between the deaf.

INVENTOR.
ALEXANDER B. CHIEFFO
BY Flam and Flam
ATTORNEYS.

PATENTED JUN 15 1971

3,585,303

INVENTOR.
ALEXANDER B. CHIEFFO
By Flam and Flam
ATTORNEYS.

TELEPHONE COMMUNICATION SYSTEM FOR THE DEAF

BRIEF SUMMARY OF THE INVENTION

Listing the advantages and conveniences of the telephone might be tedious and difficult for one accustomed to its use. But a deaf person, being deprived of its use, knows only too painfully the seemingly ordinary advantages and conveniences. The primary object of this invention is to provide a simple instrument to make possible telephone communications with the deaf, all without any alteration of the telephone equipment. This is accomplished by converting the magnetic fields on the telephone line to light flashes which are readily interpreted by the deaf.

When a deaf person places a call, the signal light comes on with the dial tone; goes on and off rhythmically with the ring; goes on and off at a characteristic rate corresponding to busy; flashes and produces a recognizable pattern corresponding to the receiver being lifted and the greeting spoken. Assuming the deaf person can speak, he then announces the fact that he is deaf but has an instrument that flashes in accordance with the sound carried on the telephone line; that questions can thus be answered by saying "yes" three times and "no" twice (corresponding to the number of letters in the words "yes" and "no"). Communication then proceeds by a series of leading questions, such as:

"Is this Logan's Pharmacy?"

flash - flash - flash

"Good. I want to refill my prescription number C72847. I repeat - C72847. Do you have that?"

flash - flash - flash

"Can you deliver within the next 2 hours?"hours?"

flash - flash

"Well then, can I pick it up in a couple hours?"

flash - flash - flash

"Thank you, I'll be there. Goodbye."

In order for a deaf person to receive a call, apparatus converts the telephone ring into a recognizable signal, such as flashing lights. Vibrators attached to a bed could also be used to awaken a deaf person. A different sequence of communication proceeds. Answering the telephone, the deaf person first looks to if the other is aware of the special circumstances which is communicated by the other dialing "O" and producing 10 fast flashes. The other person then continues in code to identify himself. For example, in my "telephone" code letters of the alphabet may be communicated by two groups of flashes. Seven flashes, pause three flashes, translates to seventh hole (PRS) third letter, namely S. Two flashes, pause one flash, translates to second hole (ABC) first letter, namely A. Six flashes, pause one flash, translates to sixth hole (MNO) first letter, namely M. Hence, "SAM." Salutations completed, the conversation may proceed as previously outlined or in an equivalent manner such as by using the dial or other codes.

Deaf persons can communicate with other deaf persons by prearranged signals and/or by code.

An object of this invention is to provide compact portable battery operated equipment usable by the deaf person so that he can communicate from any telephone.

This invention possesses many other advantages and has other objects which may be made more clearly apparent from a consideration of one embodiment of the invention. For this purpose, there is shown a form in the drawings accompanying and forming a part of the present specification, and which drawings are to scale. This form will now be described in detail, illustrating the general principles of the invention; but it is to be understood that this detailed description is not to be taken in a limiting sense, since the scope of this invention is best defined by the appended claims.

DETAILED DESCRIPTION

Figure 1:
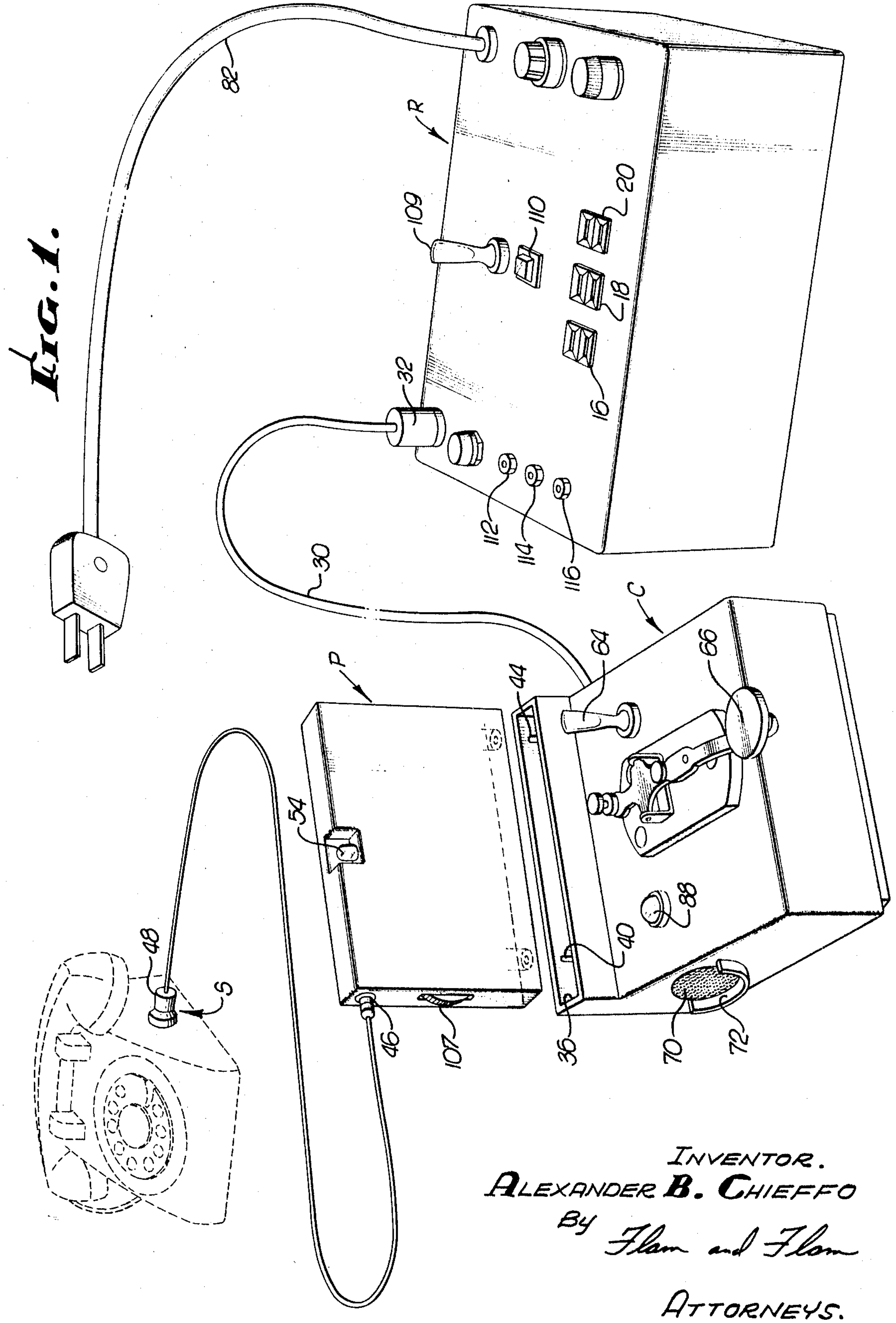
FIG. 1 is a pictorial view of the components of the system.
Figure 2:
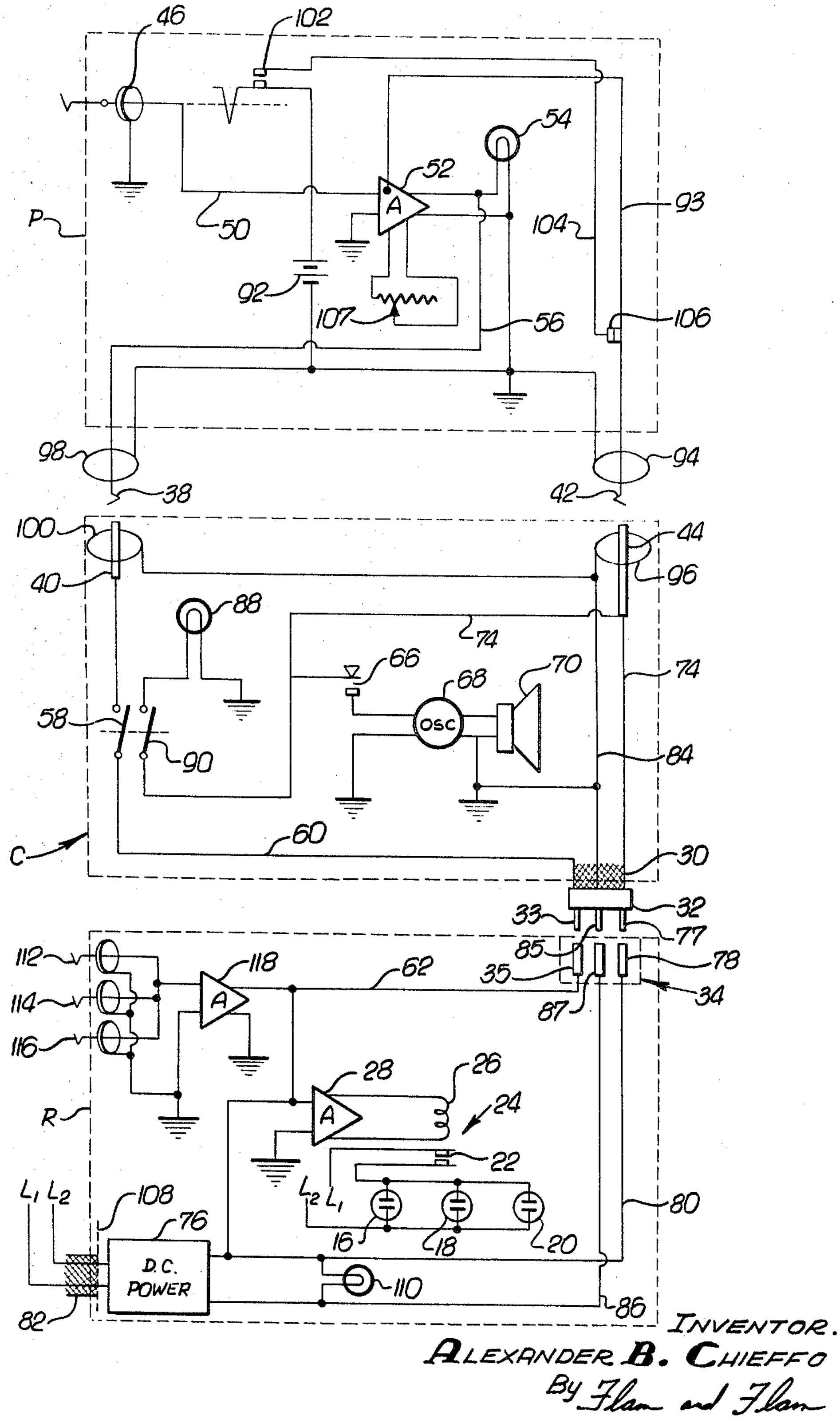
FIG. 2 is a composite wiring diagram of the three components of the system.

In FIG. 1 the components of the system are illustrated comprising a phone ringing unit R, a control unit C, and a portable unit P. The phone ringing unit has a series of service sockets 16, 18 and 20 for lamps, vibrators or other electrical appliances designed to provide a signal for the deaf person. When the telephone rings, the power to the service sockets goes on and off in synchronism with the telephone ring. For this purpose, the sockets 16, 18 and 20 (FIG. 2) are connected to power lines L-1 and L-2 through normally open contacts 22 of a ring sensing relay 24.

The ring sensing relay 24 has a coil 26 driven by an amplifier 28 the input of which is magnetically coupled to the telephone circuit. The coupling is accomplished indirectly through the control unit C, the portable unit P, and the sensing unit S (FIG. 1). The control unit C is connected to the phone ringing unit R by a three-wire cable 30 attached to the control unit C and connectors 32 and 34 (FIG. 2) attached to the end of the cable 30 and the phone ringing unit R respectively. The portable unit P, as shown in FIG. 1, has its entire lower portion fitted into a socket 36 located at the back of the control unit C. Members 38,40 and 42,44 electrically connect the units. The portable unit has a socket 46 at its upper end into which the sensing unit S is detachably plugged. The sensing unit S is detachably connected to the side of the telephone by a suction cup 48 (FIG. 1). This unit includes a pickup coil inductively coupled to the telephone circuit whereby the telephone signal is transmitted to a lead 50 in the portable unit. The signal is amplified by a high gain amplifier 52. One branch of the output from the amplifier 52 operates a small incandescent lamp 54 (see also FIG. 1) recessed below the top of the portable unit P. The other branch of the output from the amplifier 52 is conducted back to the relay driving amplifier 28 through the following elements: lead 56, connector members 38,40, switch 58, lead 60, cable 30, connector members 33,35 and lead 62 to the input of the driver amplifier 28. The relay coil thus operates in accordance with the telephone ringing signal.

When the deaf person answers the telephone, he opens the switch 58 by manipulating a handle 64 (FIG. 1). The electrical apparatus connected to sockets 16, 18 and 20 are disabled during the conversation.

If the conversation is to be conducted with a hearing person, the deaf person initiates the procedure previously described, using the lamp 54 as his sensing means.

If the conversation is to be conducted with another deaf person having like equipment, the user operates a telegraph key 66 on the control unit. The key 66 produces a signal for the telephone circuit by an oscillator 68 and a speaker 70. For this purpose, the telephone mouthpiece is rested in a cradle 72 (FIG. 1) adjacent the speaker 70. The oscillator is keyed on the input side to conserve power and minimize heat. The key 66 controls the circuit between a D.C. power lead 74 and the oscillator circuit. The power lead 74 connects with the output of a small D.C. supply 76 in the phone ringing unit R. The circuit may be traced as follows: lead 74, cable 30, connector members 77 and 78, lead 80, to the power supply 76. A service cord 82 provides the power for the power supply 76, as well as for the sockets 16, 18 and 20. A ground lead 84 companion to the lead 74 is provided in the control unit C. This lead 84 connects with ground lead 86 in the phone ringing unit through connector members 85 and 87. As the user operates the telegraph key, the lamp 54 monitors the signal.

After the conversation is completed, the user closes the switch 58 to restore the sockets 16, 18 and 20 to the control of the phone ringing circuit. A pilot light 88 in the control unit is operated with the switch 58. For this purpose, a companion switch 90 is provided that is also operated by the handle 64 to provide current for the pilot light 88 when the switch 90 is closed. In place of the switches 58 and 90, the position of the hand held part of the telephone relative to its cradle could be sensed.

The portable unit may be detached and used apart from the control unit C and the phone ringing unit R. When the units are connected, power is provided for the amplifier 52 from the D.C. power supply 86. When the units are disconnected, power for the amplifier 52 is provided by a battery 92 carried in the portable unit P. When the units are connected, power for the high gain amplifier may be traced as follows: supply lead 80, connector members 78 and 77, lead 74, connector members 44 and 42, lead 93 to the amplifier 52. Ground rings 94 and 96 are respectively associated with the connector members 42 and 44. Ground rings 98 and 100 are similarly associated with the connector members 38 and 40. The ground rings 96 and 100 of the control unit C are connected together and to the ground lead 84. Ground rings 94 and 98 of the portable unit are connected together and to the ground sides of the battery 92 and the ground sides of the input and output of the high gain amplifier 52. All these elements are electrically common when the portable unit P and the control unit C are connected together.

The battery 92 is connected to the power lead 93 for the high gain amplifier only when the units are separated, and only when the sensing unit is plugged into the portable unit. The circuit may be traced as follows: battery 92, normally open contacts of a switch 102 closed when the sensing unit is plugged in; lead 104, normally closed contacts of a switch 106 that is opened when the portable unit P is attached to the control unit C; lead 93 to the amplifier 52.

The portable unit P may be used in making calls and to receive significant signals by the aid of a lamp 54 from any remote station. For example, the deaf person may call his spouse at home and advise when he will arrive home. He may then ask if there is any message, following which communications may proceed in code.

The high gain amplifier 52 has a volume control 107 (FIGS. 1 and 2) especially useful when the portable unit P is used by itself for adjusting for background noises.

A switch 108 operated by a handle 109 (FIG. 1) is provided for controlling the power to the phone ringing unit R. A pilot light 110 glows when the power is on and the D.C. supply properly operating.

Auxiliary inputs 112, 114 and 116 may be used to operate a relay 24 and to flash the appliances connected to the outlets 16, 18 and 20 independently of the telephone circuit and the switch 58. These inputs may sense the doorbell, noise (crying) in the nursery, etc. The inputs are connected to the driver amplifier 28 through a preamplifier 118.

I claim:

1. In apparatus for enabling deaf persons to use a telephone: one or more appliance serving sockets; control means operable to connect said service sockets to a source of electrical energy; means sensing the existence of a signal at the circuit of a telephone for operating said control means; means illuminable in accordance with the signal sensed by said sensing means to enable code communications; selectively operable means for disabling said control means while communications are in progress by the aid of said telephone circuit; and a plurality of auxiliary sensing means for said control means and operable independently of said disabling means for signalling events apart from said telephone circuit.

2. In apparatus for enabling deaf persons to use a telephone: a control unit; a first connector member and a second connector member carried by said control unit; means responsive to the existence of a signal at said first connector member for signalling a deaf person; means for connecting a source of electrical potential to said second connector member; a portable unit detachably connected to said control unit by the aid of third and fourth connector members respectively electrically engageable with said first and second connector members respectively; an amplifier and an illuminable lamp all carried by said portable unit; means connecting said illuminable lamp and said third connector member to the output of said amplifier; a telephone pickup member sensing the signal of a telephone circuit and connected to the input of said amplifier; connection means between said fourth connector member and said amplifier for providing a source of power therefor; and a battery carried by said portable unit for providing power to said connection means when said fourth and second connector members are disconnected.

3. The apparatus as set forth in claim 2 together with a switch carried by said control unit for selectively disabling said signalling means.

4. The apparatus as set forth in claim 2 in which said battery is connected to said connection means by a switch closed only when said second and fourth connector members are disconnected.

5. The apparatus as set forth in claim 4 in which said pickup is detachably connected to said portable unit and in which said battery is connected to said connection means through a switch closed only when said pickup member is connected to said portable unit.

6. The combination as set forth in claim 2 together with an oscillator carried by said control unit; key means for controlling said oscillator; and means coupling the output of said oscillator to said telephone circuit including a speaker cooperable with the mouthpiece of a telephone instrument.